(12) United States Patent
Wong

(10) Patent No.: US 9,894,296 B1
(45) Date of Patent: Feb. 13, 2018

(54) IMAGE SENSOR HAVING COMBINED RESPONSES FROM LINEAR AND LOGARITHMIC PIXEL CIRCUITS

(71) Applicant: Sony Corporation, Tokyo (JP)

(72) Inventor: Ping Wah Wong, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/333,409

(22) Filed: Oct. 25, 2016

(51) Int. Cl.
*H04N 5/355* (2011.01)
*H04N 9/64* (2006.01)
*H04N 9/04* (2006.01)

(52) U.S. Cl.
CPC ..... *H04N 5/35563* (2013.01); *H04N 5/35518* (2013.01); *H04N 9/045* (2013.01); *H04N 9/646* (2013.01)

(58) Field of Classification Search
None
See application file for complete search history.

(56) References Cited

U.S. PATENT DOCUMENTS

| 6,191,408 | B1 * | 2/2001 | Shinotsuka | H04N 3/155 250/208.1 |
| 7,714,928 | B2 * | 5/2010 | Kamon | H04N 5/2351 348/362 |
| 2002/0021121 | A1 * | 2/2002 | Nakamura | H01L 27/14609 324/96 |
| 2002/0130957 | A1 * | 9/2002 | Gallagher | H04N 1/64 348/222.1 |
| 2004/0096124 | A1 * | 5/2004 | Nakamura | H04N 5/35554 382/308 |
| 2006/0244843 | A1 * | 11/2006 | Dierickx | H04N 5/235 348/226.1 |
| 2006/0268154 | A1 * | 11/2006 | Katagiri | H04N 5/235 348/370 |
| 2007/0052830 | A1 * | 3/2007 | Kamon | H04N 5/2178 348/308 |
| 2008/0251695 | A1 * | 10/2008 | Kamon | H04N 3/155 250/208.1 |
| 2008/0260298 | A1 * | 10/2008 | Kamon | H04N 3/155 382/321 |

\* cited by examiner

*Primary Examiner* — Shahbaz Nazrul
(74) *Attorney, Agent, or Firm* — Michael Best & Friedrich LLP

(57) ABSTRACT

A method of processing an image includes receiving pixel data from a pixel array, the pixel data including a plurality of linear pixel responses from a corresponding plurality of linear pixel circuits of the pixel array and a plurality of logarithmic pixel responses from a corresponding plurality of logarithmic pixel circuits; determining whether a linear or logarithmic pixel response is clipped; calculating a plurality of directionally-interpolated output pixel values for corresponding ones of the plurality of linear pixel circuits and the plurality of logarithmic pixel circuits; in a case where the linear or logarithmic pixel response is clipped, using a corresponding directionally—interpolated output pixel value as an output pixel value; in a case where the linear or logarithmic pixel response is not clipped, using the linear pixel response or the logarithmic pixel response as the output pixel value; and constructing an output image using a plurality of the output pixel values.

20 Claims, 12 Drawing Sheets

| G | r | G | b | G |
|---|---|---|---|---|
| g | R | g | B | g |
| G | b | G | r | G |
| g | B | g | R | g |
| G | r | G | b | G |

FIG. 9

|   |   | G |   |   |
|---|---|---|---|---|
|   |   | g |   |   |
|   |   | o |   |   |
|   |   | g |   |   |
|   |   | G |   |   |

| r | G | b | G | r | G | b |
|---|---|---|---|---|---|---|
| R | g | B | g | R | g | B |
| b | G | r | G | b | G | r |
| B | g | R | g | B | g | R |
| r | G | b | G | r | G | b |
| R | g | B | g | R | g | B |
| b | G | r | G | b | G | r |

FIG. 17

| r |   |   |   | r |   |   |
|---|---|---|---|---|---|---|
| R |   |   |   | R |   |   |
|   |   | r |   |   |   | r |
|   |   | R | x |   |   | R |
| r |   |   |   | r |   |   |
| R |   |   |   | R |   |   |
|   |   | r |   |   |   | r |

FIG. 18

IMAGE SENSOR HAVING COMBINED RESPONSES FROM LINEAR AND LOGARITHMIC PIXEL CIRCUITS

BACKGROUND OF THE INVENTION

1. Field of the Invention

This application relates generally to image sensors. More specifically, this application relates to a method and apparatus for combining responses from a single pixel array including pixels with both linear and logarithmic responses.

2. Description of Related Art

Image sensing devices typically consist of an image sensor, generally an array of pixel circuits, as well as signal processing circuitry and any associated control or timing circuitry. Within the image sensor itself, charge is collected in a photoelectric conversion device of the pixel circuit as a result of the impingement of light. Subsequently, the respective charges in each pixel circuit are read out as an analog signal, and the analog signal is converted to digital form by an analog-to-digital converter (ADC).

As a photoelectric conversion device, a photodiode may be used. The photodiodes are limited by the well capacity, which is the maximum amount of charge that can be stored during the exposure to light. Moreover, the analog circuits in the entire image sensor system, including the photodiodes, are subject to noise. As a result, the dynamic range, which is the ratio of the maximum to minimum light level in a single scene that can be captured by the image sensor at a given setting, is restricted.

To expand the dynamic range, various methods may be used. Some examples include the use of sensor elements having non-linear responses to light, (for example, piecewise linear response segments with different slopes, or logarithmic pixel elements), capturing multiple frames at different sensor settings and subsequently combining the frames into a single output frame, partitioning pixels within a frame into multiple groups with different sensor settings and reconstructing an output frame with digital signal processing, the use of individually controlled pixel elements, and the like.

As pixel elements, those having an approximately linear response to light ("linear pixel circuits") and those having an approximately logarithmic response to light ("logarithmic pixel circuits") exist. Linear pixel circuits result in a signal level, and thus a converted digital value, that is approximately linearly proportional to the product of the light level and the exposure time. However, above a certain product a linear pixel circuit may be become saturated or "clipped" and thus linear pixel circuits may not be useful at high light levels, long exposure times, or combinations thereof. Logarithmic pixel circuits may provide a different or wider dynamic range, but such a pixel circuit may have undesirable characteristics at the lower end; thus, logarithmic pixel circuits may not be useful at low light levels, short exposure times, or combinations thereof.

In other words, linear and logarithmic pixel circuits produce useful output signals in different illumination ranges, and are best suited for different ends of a given dynamic range. However, it is difficult to incorporate both linear pixel circuits and logarithmic pixel circuits in a single image sensor for several reasons. For example, traditional demosaicing algorithms do not produce a suitable output image for a color array including both types of pixels. Moreover, in a scene having a wide illumination range, linear pixel circuits may be clipped in a high-light area of the scene while logarithmic pixel circuits may be clipped in a low-light area of the scene. Because linear and logarithmic pixel circuits are distributed throughout the pixel array, a significant portion of the pixel circuits may be saturated, thus degrading image output.

According, there exists a need for a demosaicing method for implementation in a color image sensor having both linear and logarithmic pixel circuits (a "dual pixel image sensor") that does not suffer from these and various other deficiencies.

BRIEF SUMMARY OF THE INVENTION

In one aspect of the present disclosure, a method of processing an image comprises: receiving a pixel data from a pixel array, the pixel data including a plurality of linear pixel responses from a corresponding plurality of linear pixel circuits of the pixel array and a plurality of logarithmic pixel responses from a corresponding plurality of logarithmic pixel circuits; determining whether a respective one of the plurality of linear pixel responses or the plurality of logarithmic pixel responses is clipped; calculating a plurality of directionally-interpolated output pixel values for corresponding ones of the plurality of linear pixel circuits and the plurality of logarithmic pixel circuits; in a case where the respective linear pixel response or the respective logarithmic pixel response is clipped, using a corresponding directionally-interpolated output pixel value as a respective output pixel value; in a case where the respective linear pixel response or the respective logarithmic pixel response is not clipped, using the respective linear pixel response or the respective logarithmic pixel response as the respective output pixel value; and constructing an output image using a plurality of the respective output pixel values.

In another aspect of the present disclosure, an imaging device includes a pixel array including a plurality of linear pixel circuits and a plurality of logarithmic pixel circuits; and an image processing circuit configured to: receive a pixel data from the pixel array, the pixel data including a plurality of linear pixel responses from the plurality of linear pixel circuits and a plurality of logarithmic pixel responses the plurality of logarithmic pixel circuits, determine whether a respective one of the plurality of linear pixel responses or the plurality of logarithmic pixel responses is clipped, calculate a plurality of directionally-interpolated output pixel values for corresponding ones of the plurality of linear pixel circuits and the plurality of logarithmic pixel circuits, in a case where the respective linear pixel response or the respective logarithmic pixel response is clipped, use a corresponding directionally-interpolated output pixel value as a respective output pixel value, in a case where the respective linear pixel response or the respective logarithmic pixel response is not clipped, use the respective linear pixel response or the respective logarithmic pixel response as the respective output pixel value, and construct an output image using a plurality of the respective output pixel values.

In yet another aspect of the present disclosure, a non-transitory computer-readable medium storing thereon instructions that, when executed by a processor of an imaging device, cause the imaging device to perform operations comprising: receiving a pixel data from a pixel array, the pixel data including a plurality of linear pixel responses from a corresponding plurality of linear pixel circuits of the pixel array and a plurality of logarithmic pixel responses from a corresponding plurality of logarithmic pixel circuits;

determining whether a respective one of the plurality of linear pixel responses or the plurality of logarithmic pixel responses is clipped; calculating a plurality of directionally-interpolated output pixel values for corresponding ones of the plurality of linear pixel circuits and the plurality of logarithmic pixel circuits; in a case where the respective linear pixel response or the respective logarithmic pixel response is clipped, using a corresponding directionally-interpolated output pixel value as a respective output pixel value; in a case where the respective linear pixel response or the respective logarithmic pixel response is not clipped, using the respective linear pixel response or the respective logarithmic pixel response as the respective output pixel value; and constructing an output image using a plurality of the respective output pixel values.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which:

FIG. 9 illustrates an exemplary pixel subset for a directional gradient according to various aspects of the present disclosure.

FIG. 10 illustrates another exemplary pixel subset for a directional gradient according to various aspects of the present disclosure.

FIG. 11 illustrates another exemplary pixel subset for a directional gradient according to various aspects of the present disclosure.

FIG. 12 illustrates another exemplary pixel subset for a directional gradient according to various aspects of the present disclosure.

FIG. 13 illustrates another exemplary pixel subset for a directional gradient according to various aspects of the present disclosure.

FIG. 14 illustrates another exemplary pixel subset for a directional gradient according to various aspects of the present disclosure.

FIG. 15 illustrates another exemplary pixel subset for a directional gradient according to various aspects of the present disclosure.

FIG. 16 illustrates another exemplary pixel subset for a directional gradient according to various aspects of the present disclosure.

FIG. 17 illustrates another exemplary pixel subset for a directional gradient according to various aspects of the present disclosure.

FIG. 18 illustrates another exemplary pixel subset for a directional gradient according to various aspects of the present disclosure.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

In this manner, the present disclosure provides for improvements in the technical field of signal processing, as well as in the related technical fields of image sensing and image processing.

[Image Sensor]

Figure 1:
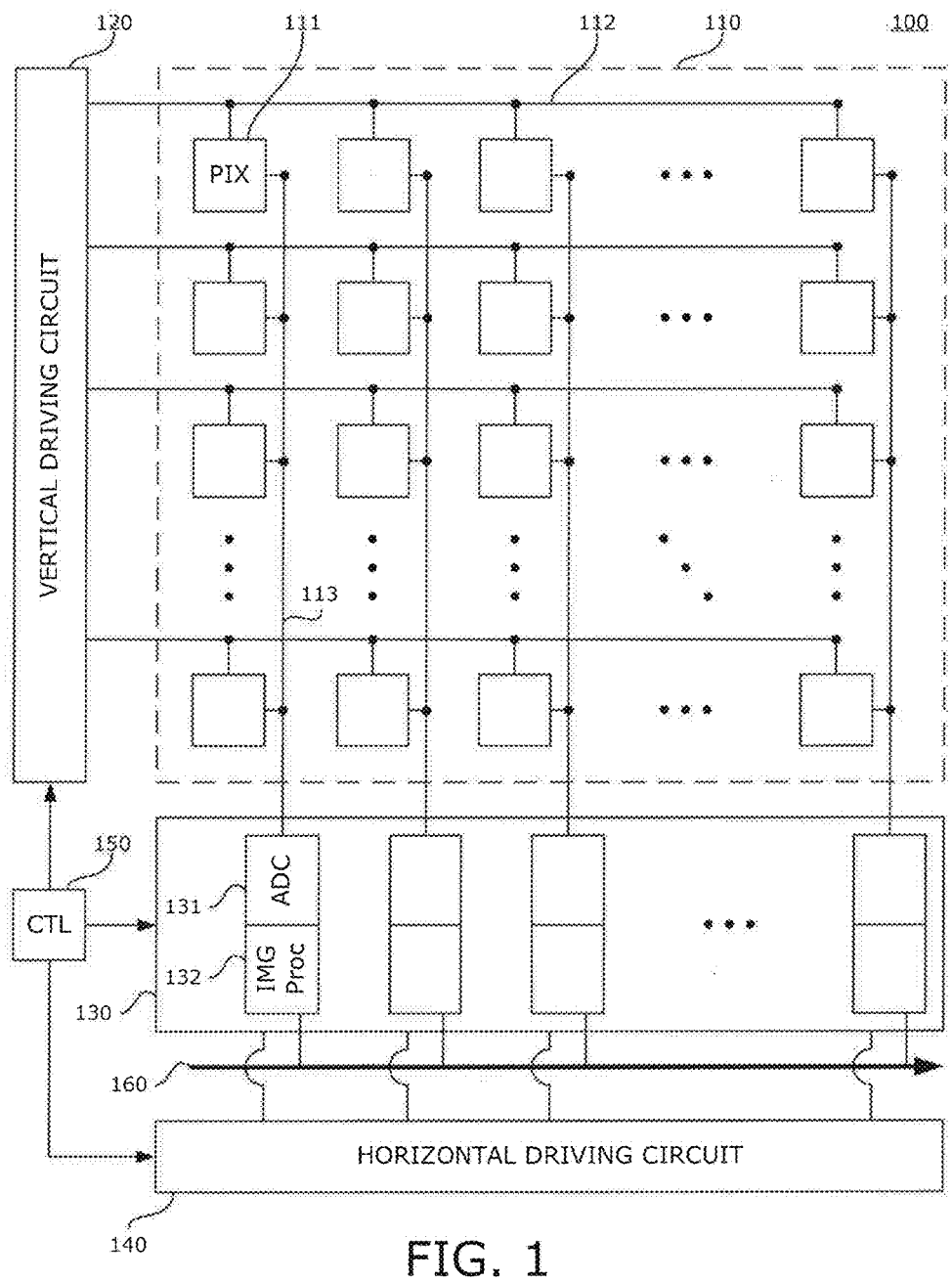
FIG. 1 illustrates an exemplary image sensor according to various aspects of the present disclosure.

FIG. 1 illustrates an image sensor 100 that includes an image processing circuit, such as an image processing circuit as described above. Image sensor includes an array 110 of pixel circuits 111. The pixel circuits 111 are located at intersections where horizontal signal lines 112 and vertical signal lines 113 cross one another; and each of the pixel circuits 111 may be one of a linear type or a logarithmic type. The horizontal signal lines 112 are operatively connected to a vertical driving circuit 120, also known as a "row scanning circuit," at a point outside of the pixel array, and carry signals from the vertical driving circuit 120 to a particular row of the pixel circuits 111. The pixel circuits 111 in a particular column output an analog signal corresponding to an amount of incident light to the vertical signal line 113. For illustration purposes, only a small number of the pixel circuits 111 are actually shown in FIG. 1; however, in practice the image sensor 100 may have up to tens of millions of pixel circuits ("megapixels" or MP) or more.

The vertical signal line 113 conducts the analog signal for a particular column to a column circuit 130. While FIG. 1 illustrates one vertical signal line 113 for each column in pixel array 110, the present disclosure is not so limited. For example, more than one vertical signal line 113 may be provided for each column, or each vertical signal line 113 may correspond to more than on column. In any case, column circuit 130 preferably includes a plurality of individual analog to digital converters (ADC) 131 and image processing circuits 132. As illustrated, the column circuit 130 includes an ADC 131 and an image processing circuit 132 for each vertical signal line 113; however, each set of ADCs and image processing circuit may correspond to more than one vertical signal line 113.

The column circuit 130 is controlled by a horizontal driving circuit 140, also known as a "column scanning circuit." Each of the vertical driving circuit 120, the column circuit 140, and the horizontal driving circuit 140 receive one or more clock signals from a controller 150. The controller 150 controls the timing and operation of various image sensor components such that analog signals from the pixel array 110, having been converted to digital signals in the column circuit 130, are output via an output line 160 to an output circuit for additional signal processing, storage, transmission, and the like.

Alternatively, the image processing circuits 132 may be omitted and the digital signal after ADC 131 from the pixel array may be sent via the output line 160 to the output circuit where image processing is performed externally. In other words, while image processing circuits 132 are illustrated as being a component of image sensor 100, the present disclosure is not so limited. Instead, image processing may be performed off-chip.

Figures 2, 3:
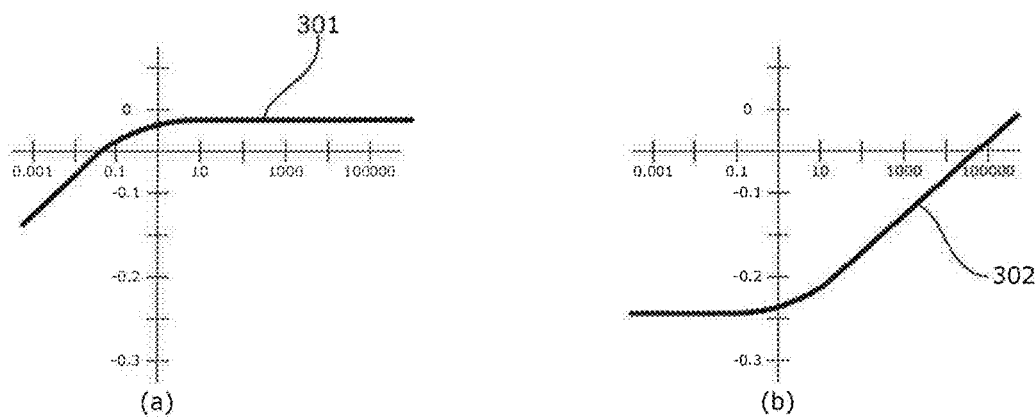
FIG. 2 illustrates an exemplary color filter array according to various aspects of the present disclosure.
FIG. 3 illustrates exemplary light response curves for pixels according to various aspects of the present disclosure.

The pixel array 110 may be overlaid with a color filter array, one example of which is illustrated in FIG. 2. FIG. 2 illustrates a portion of a color filter array 200 corresponding to a 4×4 block of the pixel circuits 111, which is preferably tiled across the extent of the pixel array 110. In FIG. 2, various letters correspond to the primary colors red, green, and blue; whereas the case of the letter corresponds to the type of pixel circuit to which a particular color filter corresponds. Thus, "r" represents a red color filter corresponding to a linear pixel circuit, "R" represents a red color filter corresponding to a logarithmic pixel circuit, "g" represents a green color filter corresponding to a linear pixel circuit, "G" represents a green color filter corresponding to a logarithmic pixel circuit, "b" represents a blue color filter corresponding to a linear pixel circuit, and "B" represents a blue color filter corresponding to a logarithmic pixel circuit. While FIG. 2 illustrates an example where three colors red, green, and blue are used, the present disclosure is not so limited and may apply to a RGBW (red, green, blue, and white) configuration, a CMY (cyan, magenta, yellow) configuration, a CYGM (cyan, yellow, green, magenta) configuration, and the like.

Thus, each pixel circuit 111 receives a particular wavelength range of incident light and converts it to a pixel value that is read therefrom as raw data. To construct a color image from the sensor raw data for the purpose of viewing, storage, or display, it is necessary to compute an output image such that each pixel of the output comprises all color component values in a standard color space; for example, sRGB, YCbCr, XYZ, CMYK, and the like. That is, each output pixel may be represented by multiple color component values in the chosen color space. This process of converting an image from the sensor raw data, where each input pixel is described by a single color component value depending on the array architecture, to a standard color image data, where each pixel is described by multiple color component values, is called demosaicing.

In the example illustrated in FIG. 2, linear pixel circuits and logarithmic pixel circuits are alternately arranged in both the row and column directions. With this configuration, the linear and logarithmic pixel circuits of different primary colors are spread throughout the array so that there are pixel circuits of both types and each primary color in any local neighborhood within the pixel array 110. Thus, it is possible to take advantage of the different operating ranges of linear and logarithmic pixel circuits.

FIG. 3 illustrates (a) an exemplary light response curve 301 for linear pixel circuits, and (b) an exemplary light response curve 302 for logarithmic pixel circuits. Both curves 301 and 302 are plotted for a fixed time frame; for example, 30 frames per second ("fps") or 33 msec. In FIG. 3, the horizontal axes represent the light levels and are illustrated in logarithmic scale, whereas the vertical axes represent photodiode voltage levels and are illustrated in linear scale. While FIG. 3 shows particular values along the horizontal and vertical axes, it will be understood that these values are merely exemplary and that actual values will depend on various factors, including but not limited to the pixel circuit architecture and materials. The light response curve 301 shows that the linear pixel circuits operate effectively below a certain light level; for example, 2 lux and lower. In this manner, when the light level is below the threshold the linear pixel circuits produce output voltages that vary with the incoming light level, and when the light level is above the threshold the linear pixel circuits clip and the output voltage no longer respond to further increases in the light level.

In contrast, the light response curve 302 shows that the logarithmic pixel circuits operate effectively above a certain light level; for example, 0.1 lux and higher. In this manner, when the light level is above the threshold the logarithmic pixel circuits produce responsive output voltages corresponding to the light level, and when the light level is below the threshold the logarithmic pixel circuits clip and the output voltages do not change with light. If the two types of pixel circuits are included together as illustrated in FIG. 2, it is possible to capture useful signals with a wider dynamic range by utilizing the linear pixel circuits at low light levels and the logarithmic pixel circuits at high light levels. To form such image data and construct a useful color output image, the two different responses may be combined together in such a way that the combined response gives increasing output with increasing light levels ("monotonicity") over a wider range and is continuous ("continuity").

[Adaptive Demosaicing]

As noted above, to produce a color output image, a demosaicing process is performed. At a pixel location where the pixel circuit response (linear or logarithmic) is clipped, all three output color component values (red, green, blue) are found by interpolation in the demosaicing process. At pixel locations where the pixel circuit response is not clipped, the pixel response value can be directly used as the one of the three output color component values for the pixel according to the color filter array arrangement (e.g., R or r pixel response value is used as the output red color component). The remaining two color component values for the pixel location are found by interpolation in the demosaicing process.

Known demosaicing algorithms, however, are not compatible with an image sensor having both linear and logarithmic pixel circuits in an array, such as the image sensor 100. That is, because the linear and logarithmic pixel circuits operate in different illumination ranges, different pixel circuit types will be clipped at different areas of the pixel array depending on the scene and the illumination.

Figure 4:
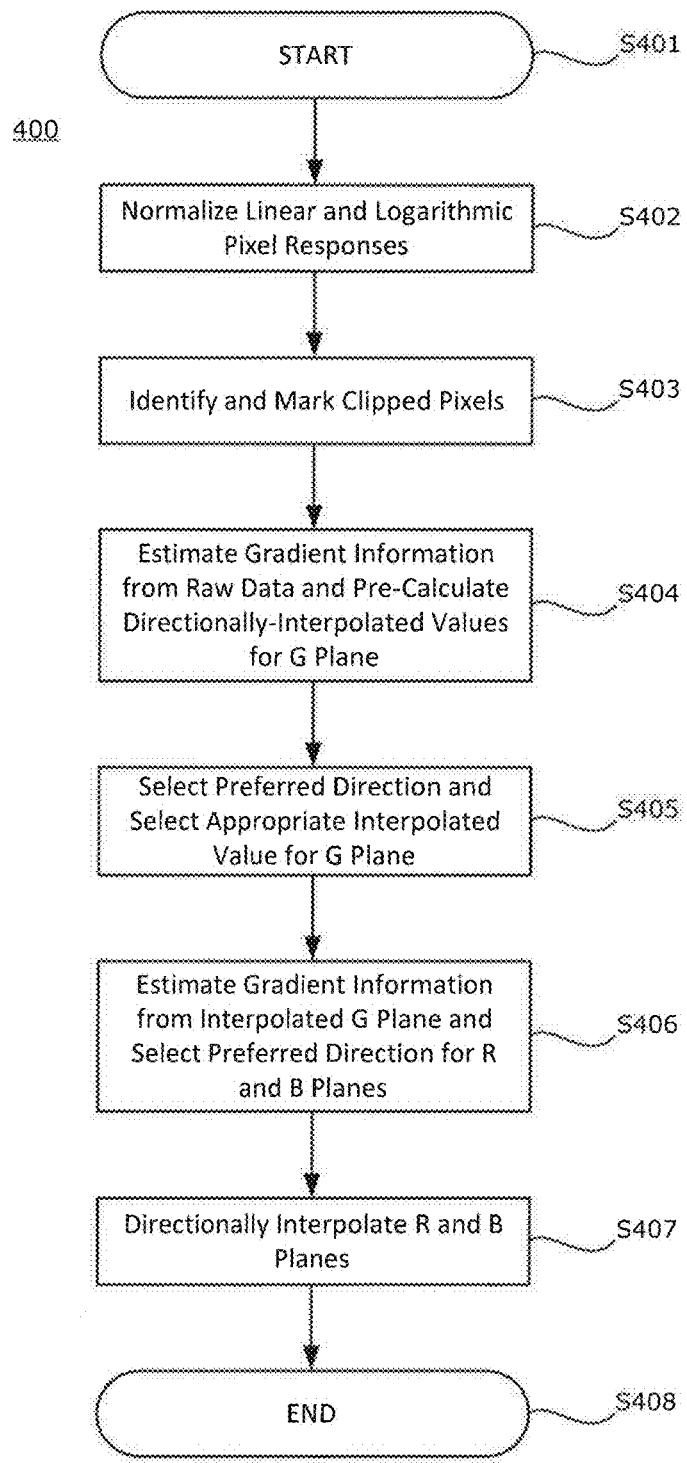
FIG. 4 illustrates an exemplary process flow for an adaptive demosaic algorithm according to various aspects of the present disclosure.

To properly operate an image sensor 100, an adaptive demosaic algorithm is preferred because an adaptive algorithm can take the structural information of an image into account. FIG. 4 illustrates an exemplary process flow for a joint adaptive demosaic algorithm 400 to be utilized with an image sensor having both linear and logarithmic pixel circuits. The joint adaptive demosaic algorithm 400 may be implemented in a column circuit within an image sensor, such as column circuit 130 described above, or in processing that occurs after the image data has been captured, output, and stored.

The joint adaptive demosaic algorithm 400 is initialized at operation S401, after which the linear and logarithmic pixel circuit responses are normalized at operation S402. After normalizing the pixel circuit responses, the joint adaptive demosaic algorithm 400 proceeds to operation S403, where the clipped pixels are identified and marked. Next, at operation S404, the gradient information is estimated from the raw data for the green plane, and directionally-interpolated data values are pre-calculated. These values are compared at operation S405, whereby a preferred gradient direction and an appropriate interpolated green plane value are selected. Subsequently, at operation S406, preferred directions for red and blue planes are selected based on an estimated gradient information from the interpolated green plane. At operation S407, the red and blue planes are directionally interpolated. Finally, the joint adaptive demosaic algorithm 400 proceeds to operation S408 and terminates. Alternatively, operation S406 may be skipped and the preferred direction used in the green plane can be used for interpolating the red and blue planes in operation S407. Each of the operations S402-S407 will be described more fully below.

Figure 5:
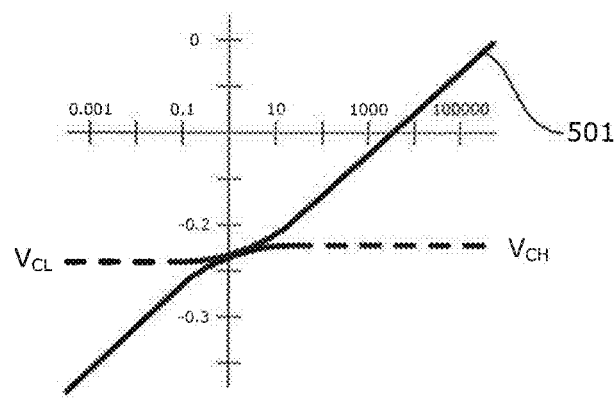
FIG. 5 illustrates an exemplary combined light response curve according to various aspects of the present disclosure.

As noted above, linear pixel circuits and logarithmic pixel circuits have different light response curves, illustrated in FIG. 3. In order to construct an output image using information from both the linear and logarithmic pixel circuits, it is necessary to normalize the two responses so that the combined response satisfies the monotonicity and continuity requirements. FIG. 5 illustrates a combined response curve 501 constructed from the individual response curves 301 and 302 so as to satisfy these requirements. In operation S402, to normalize the linear and logarithmic pixel circuit responses, (in other words, to construct the combined response curve 501), the individual response curves 301 and 302 are appropriately shifted, either in the analog readout circuit or in the digital processing steps.

Preferably, digital values from the output of the ADC (for example, within image processing circuit 132 illustrated in FIG. 1) are shifted by two predetermined constant values. That is, one predetermined value is added to the output from the linear pixel circuits, and another predetermined value is added to the output from the logarithmic pixel circuits.

In the particular illustration of FIG. 5, each tick along the horizontal axis corresponds to a power of ten such that the overall operating range of the image sensor is from 0.001 lux to 10000 lux, a dynamic range of 140 dB. Moreover, as illustrated in FIG. 5, each tick along the vertical axis corresponds to a constant interval such that the combined response curve 501 spans an output voltage range of, for example, 0.39 V (from about −0.33 V to about 0.06 V). Hence, the ADC is set up such that a swing of 0.39 V corresponds to a digital signal value swing of $2^b$ for a digital bit depth of b bits per pixel. Given the above requirements, the two predetermined constants can be selected to satisfy the following conditions: (1) the digital value corresponding to 0.0001 lux is 0; (2) the digital value corresponding to 10000 lux is $2^b-1$; and (3) the digital value for 0.35 lux from the linear pixel circuits is equivalent to the digital value for 0.35 lux from the logarithmic pixel circuits. These constraints will result in a pair of predetermined constants that are uniquely determined. While FIG. 5 shows particular values along the horizontal and vertical axes, it will be understood that these values are merely exemplary and that actual values will depend on various factors, including but not limited to the pixel circuit architecture and materials.

In the generally overlapping region approximately between 0.1 lux and 1 lux, outputs from neither the linear pixel circuits nor the logarithmic pixel circuits are clipped and thus the values from both types of pixel circuits may be used. Outside of this range, only one of the linear pixel circuit output or the logarithmic pixel circuit output is useful.

Figure 6:
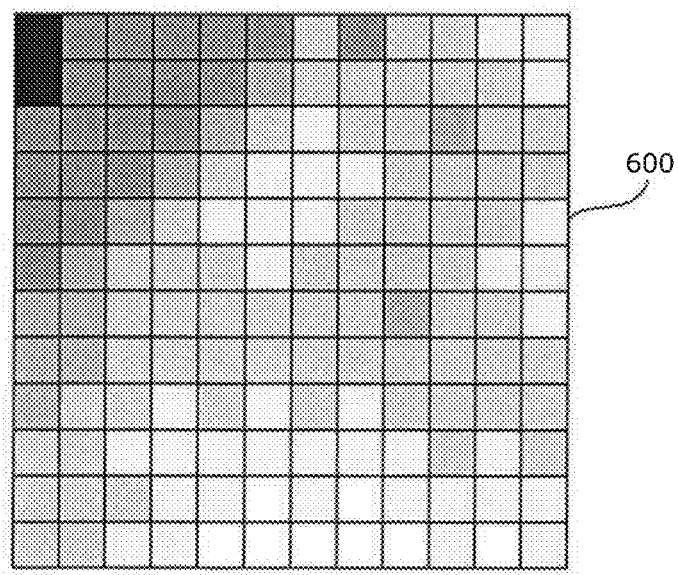
FIG. 6 illustrates an exemplary imaged scene according to various aspects of the present disclosure.

This is because below this range, the output from a logarithmic pixel circuit is clipped to a value $V_{CL}$ as illustrated in FIG. 5. Moreover, above this range, the output from a linear pixel circuit is clipped to a value $V_{CH}$ as illustrated in FIG. 5. A typical imaged scene may have lighting gradations such that some of the scene is lit above the overlapping range and some of the scene is dark below the overlapping range, as illustrated in FIG. 6, which shows gradations for an exemplary scene 600. As illustrated in FIG. 6, darker shading indicates comparatively dimly-lit conditions, whereas brighter shading indicates comparatively well-lit conditions. In this example some regions of the scene 600 lie within the overlapping region illustrated in FIG. 5 and thus produce useful output values from both the linear pixel circuits and the logarithmic pixel circuits. However, since the overlapping region illustrated in FIG. 5 is narrow compared to the overall operating range, it is to be expected that the scene 500 contains areas where the output from one of the pixel circuit types (either linear or logarithmic) is clipped. Since the clipped values cannot be used for interpolation during the joint adaptive demosaic algorithm 400, it is necessary to identify and mark which pixel circuits have a clipped output via operation S403. Preferably, the digital output value from the ADC can be used for the purpose of detecting clipping.

Referring back to FIG. 5, the clipped voltage for the linear pixel circuits is $V_{CH}$, and the clipped voltage for the logarithmic pixel circuits is $V_{CL}$. For calculation purposes, $D_{CH}$ and $D_{CL}$ are defined as the digital values from the output of the ADC corresponding to voltages $V_{CH}$ and $V_{CL}$, respectively. Moreover, a clip detection threshold value c is defined. Accordingly, if the digital value for a linear pixel circuit is higher than $D_{CH}$-ϵ, the output is considered to be clipped and it is marked so that the value from the linear pixel circuit is not used for interpolation. Similarly, if the digital value for a logarithmic pixel circuit is lower than $D_{CH}$-ϵ, the output is considered to be clipped and is marked so that the value from the logarithmic pixel circuit is not used for interpolation.

Because there may be multiple readout circuits and multiple ADCs in the analog circuit path of the image sensor, component variations may cause a difference in the actual clipped voltages of each circuit path in the image sensor. Thus, the magnitude of ϵ is preferably chosen to accommodate the analog circuit variations within the image sensor. Preferably, ϵ may be chosen as 5% of $D_{CH}$ and $D_{CL}$, respectively, such that the threshold values become 0.95 $D_{CH}$ and 1.05 $D_{CL}$.

Figure 7:
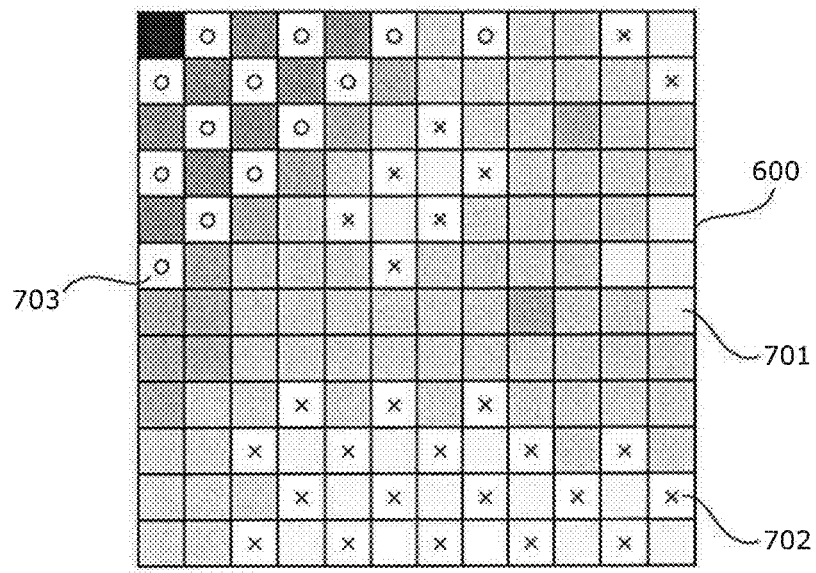
FIG. 7 illustrates the exemplary imaged scene of FIG. 6 with pixels clipped.

FIG. 7 illustrates the application of these threshold values to the scene 600. As illustrated in FIG. 7, the scene 600. Scene 600 includes unclipped pixels 701 corresponding to outputs pixel circuits within the overlapping range of FIG. 5, linear clipped pixels 702 corresponding to outputs of linear pixel circuits above the overlapping range of FIG. 5, and logarithmic clipped pixels 703 corresponding to outputs of logarithmic pixel circuits below the overlapping range of FIG. 5. For purposes of illustration, after operation S403 is performed the linear clipped pixels 702 are represented as blank pixels with an "x" therein, and the logarithmic clipped pixels 703 are represented as blank pixels with a "○" therein, while unclipped pixels 701 retain their original shading.

Therefore, in order to reconstruct a color output image, the missing red, green and blue values (where the clipped pixels exist) may be found using interpolation. Interpolation may also be used for color component values that are not defined in the raw image pixels, for example, data for the blue or green planes at the location of an R or r pixel circuit. Interpolation in the joint adaptive demosaic algorithm 400 is represented by operations S404 to S407, and illustrated in FIGS. 8-22.

Because color filter array includes a higher proportion of green pixels compared to red and blue pixels, the green plane is interpolated first in operations S404 and S405. For this purpose, the raw image data is used to estimate the gradient, and interpolation for the green plane is performed while taking the presence of edges into account. After interpolating the green plane, the red and blue planes are interpolated. To interpolate the red and blue planes, the green plane rather than the raw image data is used to estimate the gradient information. This is preferable because the green plane has already been interpolated, thus reducing calculations.

Figure 8:
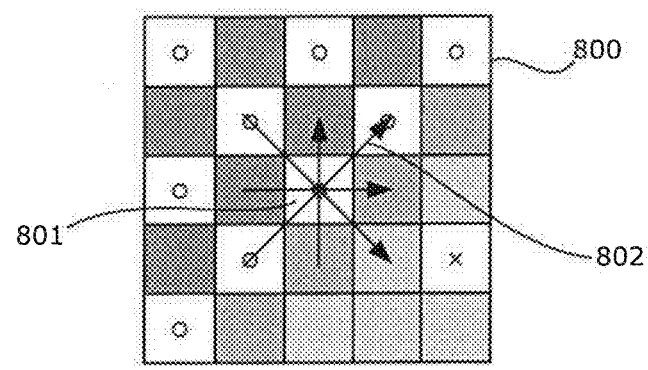
FIG. 8 illustrates exemplary directional gradients for the exemplary imaged scene of FIGS. 6-7.

In operation S404, the gradient information is estimated along four directions for each pixel. FIG. 8 illustrates an exemplary pixel subset 800, which is a 5×5 neighborhood of pixels centered around a central pixel 801, which in this illustration is a clipped logarithmic pixel. The four directions evaluated for gradient 802 are horizontal, vertical, slash, and backslash. While FIG. 8 illustrates the gradients 802 as having a particular direction (for example, with the horizontal gradient extending from left-to-right), this disclosure is not so limited. It will be understood that the left-to-right gradient, for example, is a mirror image of the right-to-left gradient.

In estimating the gradient information for a pixel in operation S404, pixel values that have been marked as clipped in operation S403 are not used. As a result, a situation may arise wherein there are directions for which a gradient cannot be estimated because of a lack of valid pixel values in the appropriate directions. In such a case, the directions for which a gradient cannot be estimated are ignored and will not be considered in the determination of a preferred direction in operation S405.

Because of the pattern of the color filter array 200, the particular calculations of gradient information and directional interpolation differ based on the pixel location. For the exemplary calculation using the pixel subset 800 of FIG. 8, the pixels are indexed using the coordinates (i,j) to represent the row and column location of a particular pixel within the pixel subset 800, for identification purposes. Using the convention where i and j run from 0 to 4 for row and column, the upper-right pixel is referred to as x(0,0); the central pixel 801 is referred to as x(2,2); and the lower-right pixel is referred to as x(4,4).

Figures 9, 10:
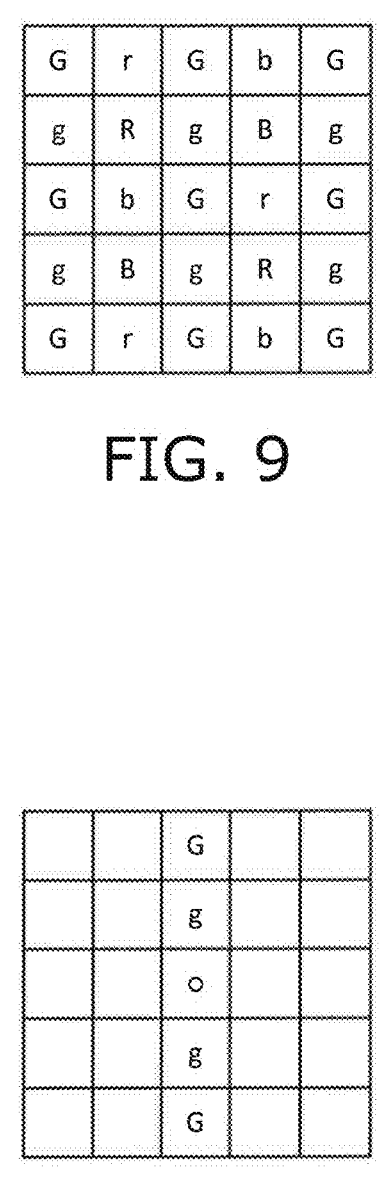

In FIG. 8, central pixel 801 is a logarithmic pixel with a G color filter; therefore, the pixel value can be used for the green color plane of pixel x(2,2) if the pixel is not clipped. However, if pixel x(2,2) has been marked as a clipped pixel as illustrated, interpolation is necessary. To this end, demosaicing for this pixel is performed by first estimating the gradient along the vertical, horizontal, and backslash directions. FIG. 9 illustrates the pixels used for this estimation, identified by their color (red, green, blue) and type (linear, logarithmic).

FIG. 10 shows the subset of pixels used in the calculations of the vertical directional gradient, where the label "○" represents that the central pixel is to be computed because it is a clipped pixel. This calculation may proceed as follows. First, each of pixels x(0,2), x(1,2), x(3,2), and x(4,2) are analyzed to determine if they are valid pixels; that is, not clipped. If all of these pixels are valid pixels, the vertical gradient strength dv and the interpolated value avgv are calculated according to the following expressions (1) and (2):

$$dv=|x(0,2)-x(4,2)|+2|x(1,2)-x(3,2)| \quad (1)$$

$$avgv = \frac{x(0,2) - 3x(1,2) + 3x(3,2) + x(4,2)}{8} \quad (2)$$

If, however, pixel x(0,2) and/or pixel x(4,2) are clipped but both of pixels x(1,2) and x(3,2) are not clipped, dv and avgv are calculated according to the following expressions (1') and (2'):

$$dv=4|x(1,2)-x(3,2)| \quad (1')$$

$$avgv = \frac{x(1,2) + x(3,2)}{2} \quad (2')$$

Otherwise, i.e., if pixel x(1,2) and/or pixel x(3,2) are clipped, both dv and avgv are not defined. In the case where dv is undefined, it will not be used in the determination of the preferred direction in operation S405. If dv is defined, the value avgv is pre-calculated at this time; subsequently in operation S406, if the vertical direction is determined to be the preferred direction, then the interpolation output is set to avgv.

Because the respective gradient strengths of various directions will be compared against one another, the gradient strengths should be normalized so that a comparison is meaningful. In the above expression (1), the first term represents a difference between two pixels over a coordinate distance of four pixels and the second term represents a difference between two pixels over a coordinate distance of two pixels. Because the second term is multiplied by two, the quantity dv represents a coordinate difference of eight pixels. In the above expression (1'), the term represents a difference between two pixels over a coordinate distance of two pixels and is thus multiplied by four such that both representations of dv are normalized to the same coordinate difference (eight). This gradient strength normalization will also be seen in the calculations of other directional gradient strengths below.

Figures 11, 12:
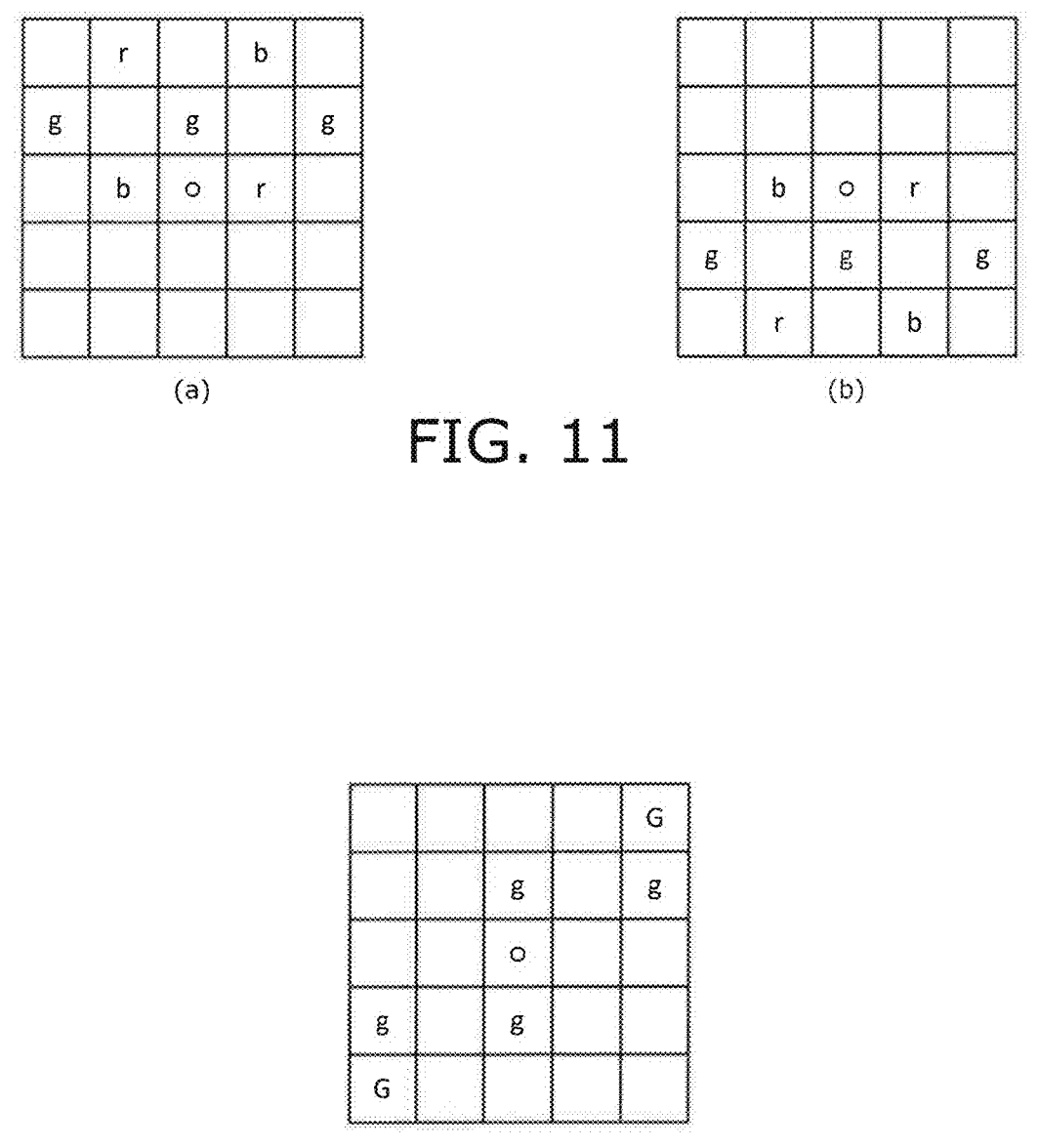

FIG. 11 shows the subsets (a) and (b) of pixels used in the calculations of the horizontal directional gradient, which contains significantly more calculations than the calculation of the vertical directional gradient. This calculation may proceed using a successive estimation method as follows. First, each of pixels x(0,1), x(0,3), x(2,1), x(2,3), x(4,1), and x(4,3) are analyzed to determine if they are valid pixels. If all of these pixels are valid pixels, a "northern" horizontal gradient strength dn and "southern" horizontal gradient strength ds are calculated according to the following expressions (3) and (4) before the horizontal gradient strength dh and the interpolated value avgh are calculated:

$$dn=|x(2,1)+x(2,3)-x(0,1)-x(0,3)| \quad (3)$$

$$ds=|x(2,1)+x(2,3)-x(4,1)-x(4,3)| \tag{4}$$

Next, dn and ds are evaluated against one another, using a threshold value thresh which may, for example, be 1% of the full range $2^b$. Specifically, if dn<ds−thresh, the calculation of avgh proceeds using pixel subset (a) of FIG. 11. If ds<dn−thresh, the calculation proceeds using pixel subset (b) of FIG. 11. More specifically, if dn<ds−thresh, each of pixels x(1,0), x(1,2), and x(1,4) are analyzed to determine if they are valid pixels. If each of these are valid pixels, dh and avgh are calculated according to the following expressions (5) and (6):

$$dh=2|x(1,0)-x(1,2)|+2|x(1,2)-x(1,4)| \tag{5}$$

$$avgh = avgh_0 + \Delta rb = \frac{x(0,1)+2x(1,2)+x(1,4)}{4} + \frac{x(2,1)+x(2,3)-x(0,1)-x(0,3)}{4} \tag{6}$$

If, however, ds<dn−thresh, each of pixels x(3,0), x(3,2), and x(3,4) are analyzed to determine if they are valid pixels. If each of these are valid pixels, dh and avgh are calculated according to the following expressions (5') and (6'):

$$dh=2|x(3,0)-x(3,2)|+2|x(3,2)-x(3,4)| \tag{5'}$$

$$avgh = avgh_0 + \Delta rb = \frac{x(3,0)+2x(3,2)+x(3,4)}{4} + \frac{x(2,1)+x(2,3)-x(4,1)-x(4,3)}{4} \tag{6'}$$

In both of the above situations, a successive estimation method is employed to determine avgh. That is, an initial estimation value $avgh_0$ is first calculated based on either a northern or southern row of green pixels. To account for a possible slope or edge in the image in the vertical direction, the initial estimation value $avgh_0$ is adjusted by a compensation value Orb, which is based on a central row of red/blue pixels and either a northern or southern row of red/blue pixels.

If neither of the above situations hold, i.e., if neither (5), (6) nor (5'), (6') were calculated, then pixels x(2,0) and x(2,4) are analyzed to determine if they are valid pixels. If both are valid pixels, dh and avgh are calculated according to the following expressions (5") and (6"):

$$dh=2|x(2,0)-x(2,4)| \tag{5"}$$

$$avgh = \frac{x(2,0)+x(2,4)}{2} \tag{6"}$$

Using the above expressions (5") and (6"), the adjustment to account for vertical slope is not necessary because the two pixels x(2,0) and x(2,4) used for interpolation are in the same row as the pixel being interpolated. If no valid configurations for the horizontal gradient estimation and interpolation exist, dh and avgh are not defined and are not used in the selection of the preferred direction in operation S405. As is the case with the vertical gradient calculation above, if the horizontal direction is subsequently determined to be the preferred direction, then the interpolation output is set to avgh.

FIG. 12 shows the subset of pixels used in the calculations of the slash directional gradient. This calculation may proceed as follows. First, each of pixels x(1,2), x(1,4), x(3,0), and x(3,2) are analyzed to determine if they are valid pixels. If all of these pixels are valid pixels, the slash gradient strength dsl and the interpolated value avgsl are calculated according to the following expressions (7) and (8):

$$dsl=2|x(1,2)-x(3,0)|+2|x(1,4)-x(3,2)| \tag{7}$$

$$avgsl = \frac{3x(1,2)+x(3,0)+x(1,4)+3x(3,2)}{8} \tag{8}$$

If, however one or more of these pixels are clipped, pixels x(0,4) and x(4,0) are analyzed to determine if they are valid pixels. If both pixels are valid pixels, dsl and avgsl are calculated according to the following expressions (7') and (8'):

$$dsl=2|x(0,4)-x(4,0)| \tag{7'}$$

$$avgsl = \frac{x(0,4)+x(4,0)}{2} \tag{8'}$$

If, instead, pixel x(0,4) and/or pixel x(4,0) are clipped, both dsl and avgsl are not defined. In the case where dsl is undefined, it will not be used in the determination of the preferred direction in operation S405. If dsl is defined, the value avgsl is pre-calculated at this time; subsequently in operation S406, if the slash direction is determined to be the preferred direction, then the interpolation output is set to avgsl.

Figures 13, 14:
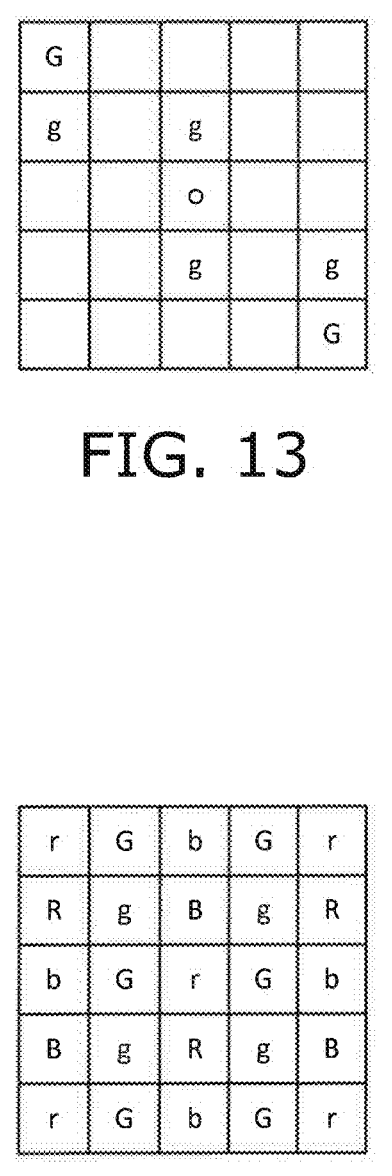

FIG. 13 shows the subset of pixels used in the calculations of the backslash directional gradient. This calculation may proceed as follows. First, each of pixels x(1,0), x(1,2), x(3,2), and x(3,4) are analyzed to determine if they are valid pixels. If all of these pixels are valid pixels, the backslash gradient strength dbs and the interpolated value avgbs are calculated according to the following expressions (9) and (10):

$$dbs=2|x(1,0)-x(3,2)|+2|x(1,2)-x(3,4)| \tag{9}$$

$$avgbs = \frac{3x(1,0)+x(3,2)+x(1,2)+3x(3,4)}{8} \tag{10}$$

If, however one or more of these pixels are clipped, pixels x(0,0) and x(4,4) are analyzed to determine if they are valid pixels. If both pixels are valid pixels, dbs and avgb are calculated according to the following expressions (9') and (10'):

$$dbs=2|x(0,0)-x(4,4)| \tag{9'}$$

$$avgbs = \frac{x(0,0)+x(4,4)}{2} \tag{10'}$$

If, instead, pixel x(0,0) and/or pixel x(4,4) are clipped, both dbs and avgbs are not defined. In the case where dbs is undefined, it will not be used in the determination of the preferred direction in operation S405. If dbs is defined, the value avgbs is pre-calculated at this time; subsequently in operation S406, if the backslash direction is determined to be the preferred direction, then the interpolation output is set to avgbs.

The above calculations are appropriate for the case illustrated in FIG. 9; that is, where a green pixel is to be interpolated. Other pixel configurations may be necessary for interpolation. FIG. 14 illustrates one such example, where the center pixel x(2,2) is a red pixel. Here, the goal of operations S404 and S405 are to compute a green value for the pixel at (2,2) by interpolation; thus, analogous steps for calculating estimated gradient strengths and directional interpolated values are performed.

Figures 15, 16:
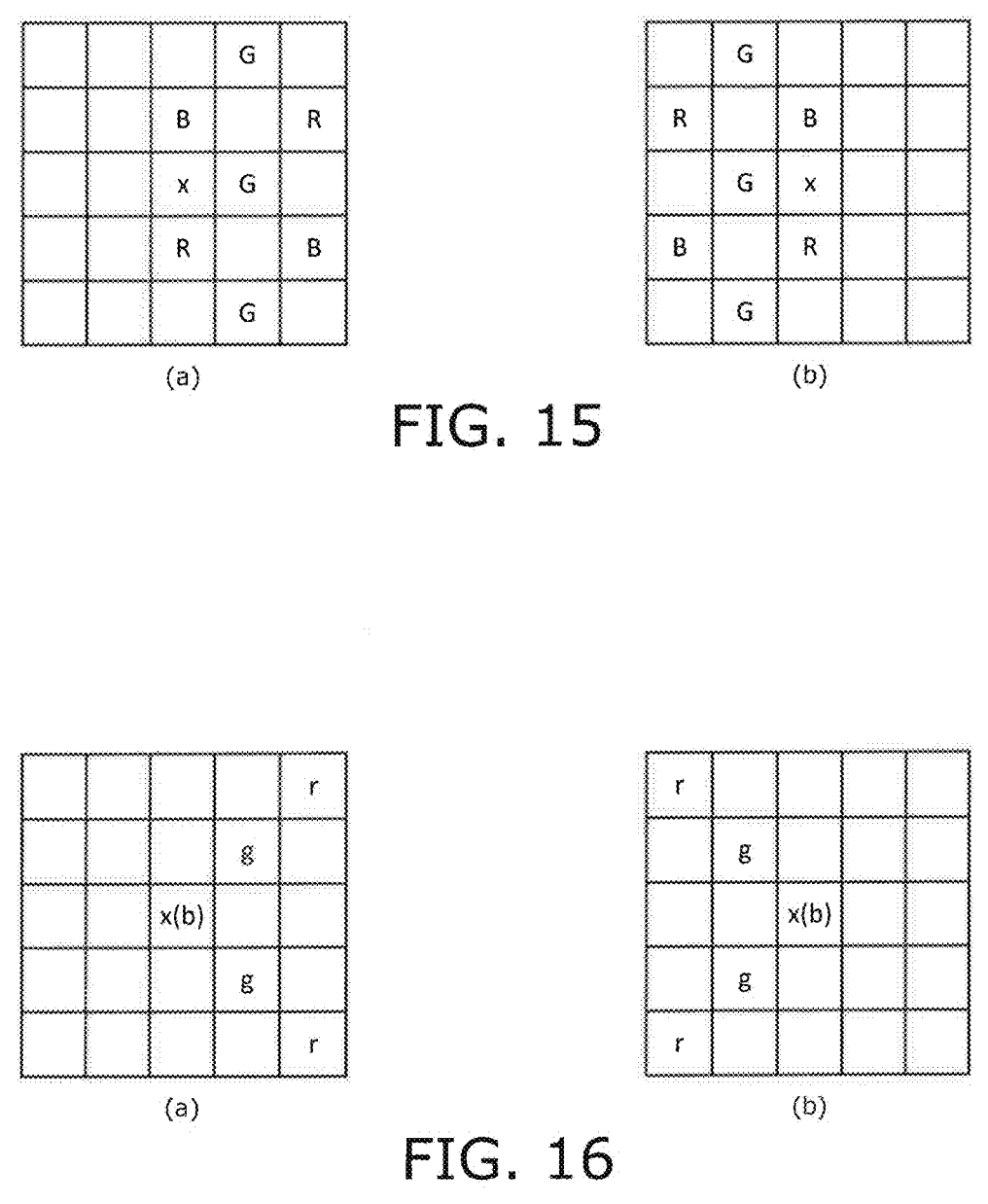

FIG. 15 shows a first pair of subsets (a) and (b) of pixels used in the calculations of the vertical directional gradient for the pixel configuration illustrated in FIG. 14, and FIG. 16 shows a second, alternate, pair of subsets (a) and (b) of pixels for this calculation. This calculation contains a similar degree of complexity to the horizontal directional gradient for a green pixel, described above with regard to FIG. 11. The calculation proceeds using a successive estimation method as follows. As an initial inquiry, each of pixels x(1,0), x(3,0), x(1,2), x(3,2), x(1,4), and x(3,4) are analyzed to determine if they are valid pixels. If all of these pixels are valid pixels, dv and avgv are calculated using the first subset illustrated in FIG. 15. If one or more of these pixels are valid pixels, and all of pixels x(0,0), x(0,4), x(2,2), x(4,0), and x(4,4) are valid pixels, dv and avgv are calculated using the second subset illustrated in FIG. 16.

In either case, an "eastern" vertical gradient strength de and "western" vertical gradient strength dw are first calculated before the vertical gradient strength dv and the interpolated value avgv are calculated. If the first subset is used, de and dw are calculated according to the following expressions (11) and (12):

$$de=|x(1,2)+x(3,2)-x(1,4)-x(3,4)| \quad (11)$$

$$dw=|x(1,2)+x(3,2)-x(1,0)-x(3,0)| \quad (12)$$

Next, de and dw are evaluated against one another, using a threshold value thresh which may be, for example, the same as the value used above in comparing do and ds. If de<dw−thresh, the calculation of avgv proceeds using pixel subset (a) of FIG. 15. If dw<de−thresh, the calculation proceeds using pixel subset (b) of FIG. 15. The gradient estimation and directional interpolation are performed using similar calculations as above with regard to expressions (5), (6), (5'), (6'), (5"), and (6"), except that the pixel positions used should be rotated by 90 degrees.

If the first subset does not produce a valid estimate because of clipped pixels or otherwise, the second subset is used. As illustrated in FIG. 16, the central pixel x(2,2) is marked with x(b) to indicate that if the second subset is used, de and dw are calculated according to the following expressions (11') and (12'):

$$de=|2x(2,2)-x(0,4)-x(4,4)| \quad (11')$$

$$dw=|2x(2,2)-x(0,0)-x(4,0)| \quad (12')$$

Next, de and dw are evaluated against one another, using a threshold value thresh which may be, for example, the same as the values used above. If de<dw−thresh, the calculation of avgv proceeds using pixel subset (a) of FIG. 16. If dw<de−thresh, the calculation proceeds using pixel subset (b) of FIG. 16. More specifically, if de<dw−thresh, pixels x(1,3) and x(3,3) are analyzed to determine if they are valid pixels. If both of these are valid pixels, dv and avgv are calculated according to the following expressions (13) and (14):

$$dv=4|x(1,3)-x(3,3)| \quad (13)$$

$$avgv = avgv_0 + \Delta rb = \frac{x(1,3)+x(3,3)}{2} + \frac{x(2,2) - \frac{x(0,4)+x(4,4)}{2}}{2} \quad (14)$$

If, however, dw<de−thresh, pixels x(1,1) and x(3,1) are analyzed to determine if they are valid pixels. If both of these are valid pixels, dv and avgv are calculated according to the following expressions (13') and (14'):

$$dv=4|x(1,1)-x(3,1)| \quad (13')$$

$$avgv = avgv_0 + \Delta rb = \frac{x(1,1)+x(3,1)}{2} + \frac{x(2,2) - \frac{x(0,0)+x(4,0)}{2}}{2} \quad (14')$$

In both of the above situations, a successive estimation method is employed to determine avgv, whereby an initial estimation value $avgv_0$ is based on either an eastern or western column of green pixels and adjusted by a compensation value Arb based on an eastern or western column of red/blue pixels.

Other pixel combinations can be considered, and calculation steps using a similar approach may be performed taking into consideration the available (unclipped) pixels in the neighborhood. The specifics of these calculations are not further described here.

Once the above calculations have been completed, the joint adaptive demosaic algorithm 400 proceeds to operation S405 to select the preferred direction and appropriate interpolated value for the green plane. In operation S405, the strengths (that is, the absolute values) of the gradients in the four directions are compared to one another. A strong gradient in a particular direction indicates a likelihood that there is a strong edge perpendicular to that direction. For example, a strong vertical gradient dv suggests that there may be a strong horizontal edge, and as a result interpolation in the vertical direction should be avoided.

After comparing the respective gradient strengths that are defined in the four directions, operation S405 determines whether there is a direction having a gradient strength significantly lower than in the other directions. "Significantly lower" may mean that a particular gradient strength is lower than the other gradient strengths by more than a predetermined value δ. δ may be chosen as a percentage of the lowest gradient strength value, as a percentage of the local average pixel value, and the like. If there is a direction with a significantly lower gradient strength than all other directions, it is selected as the preferred direction for directional interpolation of the particular pixel. If no preferred direction is found (that is, if no direction has a gradient strength significantly lower than the other directions), then interpolation may be performed in a non-directional manner.

Once a preferred direction has been selected, and still in operation S405, the appropriate interpolated value (previously calculated in operation S404) is selected for the green plane. In other words, if the horizontal direction is selected, the green component of the output pixel is set to avgh; if the vertical direction is selected, the green component of the output pixel is set to avgv; if the slash direction is selected, the green component of the output pixel is set to avgsl; and if the backslash direction is selected, the green component of the output pixel is set to avgbs.

If no preferred direction exists, it may be because no gradient strength is significantly lower than the others, or because there is no valid gradient in any direction. In the former case, the directionally interpolated values in the valid directions are averaged to produce the green component of the output pixel. In the latter case, the existing green raw pixel values within the 5×5 neighborhood are averaged to produce the green component of the output pixel.

Moreover, while FIG. 4 illustrates the pre-calculation operations performed in operation S404 and the pre-calculated value selected in operation S405, this disclosure is not so limited. For example, operation S404 may calculate only the gradient information, and operation S405 may then calculate the directionally-interpolated values only for the preferred direction after selection.

Once the green plane has been interpolated, there is a green component value for each pixel location; that is, there is no invalid or clipped green component value at any pixel location within the output image. Therefore, gradient information can always be estimated using the interpolated green plane for any pixel in any of the four directions; thus, it is preferable to use the interpolated green plane to estimate gradient information in order to interpolate the red and blue planes. This occurs in operation S406.

Preferably, a 5×5 neighborhood of pixels from the interpolated green plane is used for estimating the gradient information in the red and blue planes. Because every 5×5 neighborhood of pixels includes no clipped or invalid pixels, the particular methods of calculating the gradients in this operation are not further described, and may be selected accordingly. After the gradients have been calculated for the four directions, the gradient strengths are represented by the absolute values of the respective gradients as above.

Subsequently, the direction with a gradient strength significantly lower than the other directions is chosen and designated as the preferred direction for interpolation. As above, if there is no direction with a gradient strength significantly lower than all other directions, a preferred direction is not assigned and interpolation is performed in a non-directional manner.

Alternatively, it is possible to skip the calculation of gradients and selection of preferred direction in operation S406. The preferred directions that were used in operation S405 for the green plane can also be used for the interpolation of the red and blue planes.

The joint adaptive demosaic algorithm 400 then proceeds to operation S407. In operation S407, based on the preferred direction for each pixel location, directional interpolations for the red and blue planes are performed. Preferably, a 7×7 neighborhood of pixels is used for this interpolation. FIG. 17 illustrates an example of the pixels used for this interpolation. Using the convention where i and j run from 0 to 6 for each row and column, the upper right pixel is referred to as x(0,0); the central pixel is referred to as x(3,3); and the lower-right pixel is referred to as x(6,6). FIGS. 18-22 detail the interpolation of the red plane for pixel x(3,3). The interpolation of the blue plane will proceed in a similar manner.

FIG. 18 illustrates the central pixel x(3,3), as well as red pixels (both linear and logarithmic) within the 7×7 neighborhood that may be used for interpolation of the red plane at x(3,3). To interpolate, the preferred direction determined in operation S406 is used for selecting the pixels to be used from among the pixels illustrated in FIG. 18. The interpolated value for output pixels in the red plane are calculated using a successive estimation method.

Figure 19:
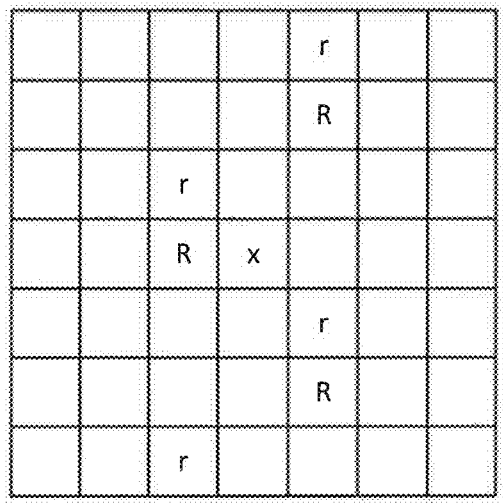
FIG. 19 illustrates another exemplary pixel subset for a directional gradient according to various aspects of the present disclosure.

For example, FIG. 19 illustrates the subset of pixels used where the vertical direction has been selected as the preferred direction. The calculation of the interpolated value may proceed as follows, where g(i,j) represents the interpolated green component values at row i, column j of the subset (which are available for all pixels as a result of operation S405); x(i,j) represents the raw pixel value at row i, column j of the subset; and redv represents the vertically interpolated red component value. In this calculation, an "eastern" vertical gradient strength de and "western" vertical gradient strength dw are calculated based on the interpolated green plane, according to the following expressions (15) and (16):

$$de=|g(3,3)-g(3,4)| \quad (15)$$

$$dw=|g(3,3)-g(3,2)| \quad (16)$$

Next, de and dw are evaluated against one another, using a threshold value thresh which may be, for example, the same as the value used above. In a case where de<dw−thresh, a first evaluation is performed whereby pixels x(1,4) and x(5,4) are analyzed to determine if they are valid pixels. If both pixels are valid pixels, redv is calculated according to the following expression (17):

$$redv = avg_0 + \Delta g = \frac{x(1,4)+x(5,4)}{2} + g(3,3) - g(3,4) \quad (17)$$

Here, $avg_0$ represents the initial estimation value based on raw pixels x(1,4) and x(5,4), and $\Delta g$ represents a compensation value based on a central row of the interpolated green plane. If one or both of pixels x(1,4) and x(5,4) are clipped, a second evaluation is performed whereby pixels x(0,4) and x(4,4) are analyzed to determine if they are valid pixels. If both pixels are valid pixels, redv is calculated according to the following expression (17'):

$$redv = avg_0 + \Delta g = \frac{3x(4,4)+x(0,4)}{4} + g(3,3) - g(3,4) \quad (17')$$

In a case where de<dw−thresh, however, a third evaluation is performed whereby pixel x(3,2) is analyzed to determine if it is a valid pixel. If the pixel is a valid pixel, redv is calculated according to the following expression (17"):

$$redv=avg_0+\Delta g=x(3,2)+g(3,3)-g(3,2) \quad (17")$$

If pixel x(3,2) is clipped, a fourth evaluation is performed whereby pixels x(2,2) and x(6,2) are analyzed to determine if they are valid pixels. If both pixels are valid pixels, redv is calculated according to the following expression (17'''):

$$redv = avg_0 + \Delta g = \frac{3x(2,2)+x(6,2)}{4} + g(3,3) - g(3,2) \quad (17''')$$

If none of the above expressions (17) through (17''') are able to be calculated due to clipped pixels, redv is undefined.

Figure 20:
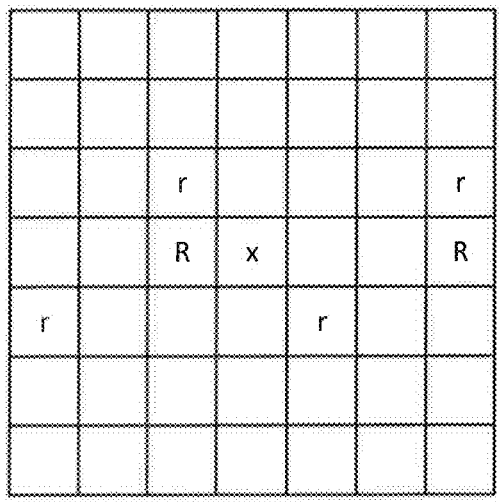
FIG. 20 illustrates another exemplary pixel subset for a directional gradient according to various aspects of the present disclosure.

FIG. 20 illustrates the subset of pixels used where the horizontal direction has been selected as the preferred direction. First, pixels x(3,2) and x(3,6) are analyzed to determine if they are valid pixels. If both pixels are valid pixels, the horizontally interpolated red component value redh is calculated according to the following expression (18):

$$redh = \frac{3x(3,2) + x(3,6)}{4} \quad (18)$$

If one or both of pixels x(3,2) and x(3,6) are clipped, the calculation proceeds using a successive estimation method, whereby a "northern" horizontal gradient strength dn and a "southern" horizontal gradient strength ds are first calculated, and then used to determine redh, according to the following expressions (19) and (20):

$$dn = |g(3,3) - g(2,3)| \quad (19)$$

$$ds = |g(3,3) - g(4,3)| \quad (20)$$

Next, dn and ds are evaluated against one another, using a threshold value thresh which may be, for example, the same as the values used above. If dn<ds−thresh, pixels x(2,2) and x(2,6) are analyzed to determine if they are valid pixels. If both are valid pixels, redh is calculated according to the following expression (21):

$$redh = avg_0 + \Delta g = \frac{3x(2,2) + x(2,6)}{4} + g(3,3) - g(2,3) \quad (21)$$

If one or both of pixels x(2,2) and x(2,6) are clipped, redh is not defined. On the other hand, in a case where ds<dn−thresh, pixels x(4,0) and x(4,4) are analyzed to determine if they are valid pixels. If both are valid pixels, redh is calculated according to the following expression (21'):

$$redh = avg_0 + \Delta g = \frac{x(4,0) + 3x(4,4)}{4} + g(3,3) - g(4,3) \quad (21')$$

If one or both of pixels x(4,0) and x(4,4) are clipped, redh is not defined. Moreover, if any of the above situations do not apply, redh is similarly not defined.

Figure 21:
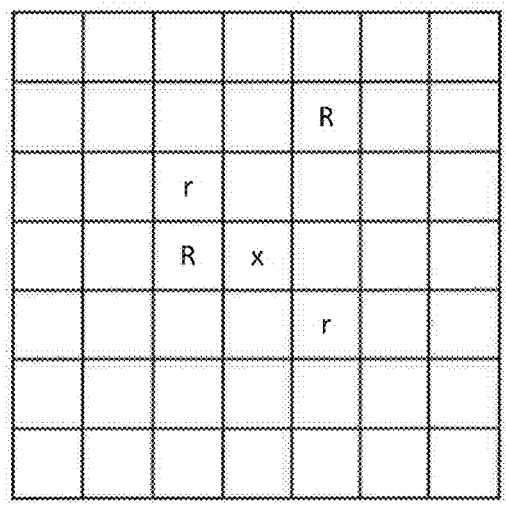
FIG. 21 illustrates another exemplary pixel subset for a directional gradient according to various aspects of the present disclosure.

FIG. 21 illustrates the subset of pixels used where the slash direction is the preferred direction. First, pixels x(1,4) and x(3,2) are analyzed to determine if they are valid pixels. If they are both valid pixels, the slash interpolated red component redsl is calculated according to the following expression (22):

$$redsl = avg_0 + \Delta g = \frac{x(1,4) + 3x(3,2)}{4} + g(3,3) - \frac{g(2,3) + g(3,2)}{2} \quad (22)$$

If one or both of pixels x(1,4) and x(3,2) are clipped, redsl is calculated according to a successive estimation method, whereby a "northwestern" slash gradient strength dnw and a "southeastern" slash gradient strength is first calculated, and then used to determine redsl, according to the following expressions (23) and (24):

$$dnw = |g(3,3) - g(2,2)| \quad (23)$$

$$dse = |g(3,3) - g(4,4)| \quad (24)$$

Next, dnw and dse are evaluated against one another, using a threshold value thresh which may be, for example, the same as the values used above. If dnw<dse−thresh, pixel x(2,2) is analyzed to determine if it is a valid pixel. If it is a valid pixel, redsl is calculated according to the following expression (25):

$$redsl = avg_0 + \Delta g = x(2,2) + g(3,3) - g(2,2) \quad (25)$$

On the other hand, in a case where dse<dnw−thresh, pixel x(4,4) is analyzed to determine if it is a valid pixel. If it is a valid pixel, redsl is calculated according to the following expression (25'):

$$redsl = avg_0 + \Delta g = x(4,4) + g(3,3) - g(4,4) \quad (25')$$

If the above situations do not apply (for example, if dnw<dse−thresh but x(2,2) is clipped), redsl is not defined.

Figure 22:
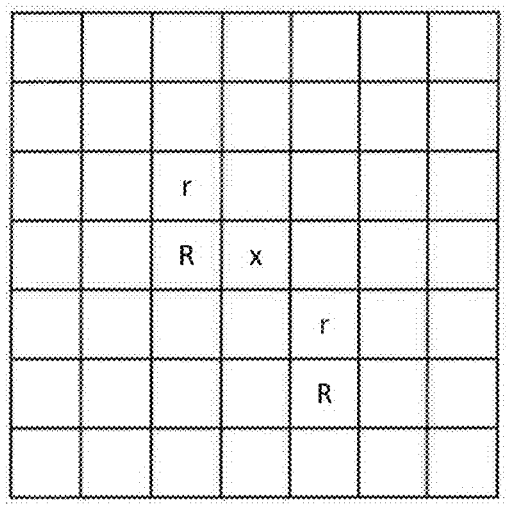
FIG. 22 illustrates another exemplary pixel subset for a directional gradient according to various aspects of the present disclosure.

FIG. 22 illustrates the subset of pixels used where the backslash direction is the preferred direction. First, pixels x(2,2) and x(4,4) are analyzed to determine if they are valid pixels. If they are both valid pixels, the backslash interpolated red component redbs is calculated according to the following expression (26):

$$redbs = \frac{x(2,2) + x(4,4)}{2} \quad (26)$$

If one or both of pixels x(2,2) and x(4,4) are clipped, pixels x(3,2) and x(5,4) are analyzed to determine if they are valid pixels. If they are both valid pixels, redbs is calculated according to the following expression (26'):

$$redbs = avg_0 + \Delta g = \frac{3x(3,2) + x(5,4)}{4} + g(3,3) - \frac{g(3,2) + g(4,3)}{2} \quad (26')$$

As in the case of interpolating for the green plane, the specific calculation steps in the red and blue planes depend on the pixel location within the CFA. The calculations can be performed using the similar estimate-and-adjust (or successive approximation) method while taking into account the configuration of valid neighborhood pixel values.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of processing an image, comprising:
receiving a pixel data from a pixel array, the pixel data including a plurality of linear pixel responses from a corresponding plurality of linear pixel circuits of the pixel array and a plurality of logarithmic pixel responses from a corresponding plurality of logarithmic pixel circuits;
determining whether a respective one of the plurality of linear pixel responses or the plurality of logarithmic pixel responses is clipped;
calculating a plurality of directionally-interpolated output pixel values for corresponding ones of the plurality of linear pixel circuits and the plurality of logarithmic pixel circuits;
in a case where the respective linear pixel response or the respective logarithmic pixel response is clipped, using a corresponding directionally-interpolated output pixel value as a respective output pixel value;
in a case where the respective linear pixel response or the respective logarithmic pixel response is not clipped, using the respective linear pixel response or the respective logarithmic pixel response as the respective output pixel value; and
constructing an output image using a plurality of the respective output pixel values.

2. The method according to claim 1, further comprising:
normalizing the plurality of linear pixel responses and the plurality of logarithmic pixel responses.

3. The method according to claim 1, wherein the calculating includes:
estimating a plurality of directional gradients, respective ones of the plurality of directional gradients corresponding to one of a plurality of directions;
pre-calculating a plurality of gradient strengths and the plurality of directionally-interpolated values, corresponding to the plurality of directions;
selecting a preferred direction from the plurality of directions based on the plurality of gradient strengths; and
selecting, as the output pixel value, a respective directionally-interpolated value corresponding to the preferred direction.

4. The method according to claim 1, where the determining includes comparing the respective linear pixel response or the respective logarithmic pixel response to a threshold value.

5. The method according to claim 1, wherein respective ones of the linear and logarithmic pixel circuits correspond to one of a plurality of colors.

6. The method according to claim 5, wherein the calculating includes:
for a first color of the plurality of colors:
estimating a plurality of directional gradients, respective ones of the plurality of directional gradients corresponding to one of a first plurality of directions,
pre-calculating a first plurality of gradient strengths and the plurality of directionally-interpolated values, corresponding to the first plurality of directions,
selecting a first preferred direction from the plurality of directions based on the first plurality of gradient strengths, and
selecting, as the output pixel value, a respective directionally-interpolated value corresponding to the first preferred direction; and
for a second color of the plurality of colors:
calculating a second plurality of gradient strengths corresponding to a second plurality of directions,
selecting a second preferred direction from the second plurality of directions based on the second plurality of gradient strengths, and
calculating, as the output pixel value, a respective directionally-interpreted value corresponding to the second preferred direction.

7. The method according to claim 6, wherein the first color is green.

8. The method according to claim 6, wherein the calculating further includes:
for a third color of the plurality of colors:
calculating, as the output pixel value, a respective directionally-interpreted value corresponding to the second preferred direction.

9. The method according to claim 8, wherein the first color is green, the second color is red, and the third color is blue.

10. An imaging device, comprising:
a pixel array including a plurality of linear pixel circuits and a plurality of logarithmic pixel circuits; and
an image processing circuit configured to:
receive a pixel data from the pixel array, the pixel data including a plurality of linear pixel responses from the plurality of linear pixel circuits and a plurality of logarithmic pixel responses the plurality of logarithmic pixel circuits,
determine whether a respective one of the plurality of linear pixel responses or the plurality of logarithmic pixel responses is clipped,
calculate a plurality of directionally-interpolated output pixel values for corresponding ones of the plurality of linear pixel circuits and the plurality of logarithmic pixel circuits,
in a case where the respective linear pixel response or the respective logarithmic pixel response is clipped, use a corresponding directionally-interpolated output pixel value as a respective output pixel value,
in a case where the respective linear pixel response or the respective logarithmic pixel response is not clipped, use the respective linear pixel response or the respective logarithmic pixel response as the respective output pixel value, and construct an output image using a plurality of the respective output pixel values.

11. The imaging device according to claim 10, wherein the image processing circuit is configured to normalize the plurality of linear pixel responses and the plurality of logarithmic pixel responses.

12. The imaging device according to claim 10, wherein the image processing circuit is configured to:
- estimate a plurality of directional gradients, respective ones of the plurality of directional gradients corresponding to one of a plurality of directions;
- pre-calculate a plurality of gradient strengths and the plurality of directionally-interpolated values, corresponding to the plurality of directions;
- select a preferred direction from the plurality of directions based on the plurality of gradient strengths; and
- select, as the output pixel value, a respective directionally-interpolated value corresponding to the preferred direction.

13. The imaging device according to claim 10, wherein the image processing circuit is configured to compare the respective linear pixel response or the respective logarithmic pixel response to a threshold value.

14. The imaging device according to claim 10, further comprising a color filter array disposed over the pixel array.

15. The imaging device according to claim 10, wherein respective ones of the linear and logarithmic pixel circuits correspond to one of a plurality of colors.

16. The imaging device according to claim 15, wherein the image processing circuit is configured to:
- for a first color of the plurality of colors:
  - estimate a plurality of directional gradients, respective ones of the plurality of directional gradients corresponding to one of a first plurality of directions,
  - pre-calculate a first plurality of gradient strengths and the plurality of directionally-interpolated values, corresponding to the first plurality of directions,
  - select a first preferred direction from the plurality of directions based on the first plurality of gradient strengths, and
  - select, as the output pixel value, a respective directionally-interpolated value corresponding to the first preferred direction; and
- for a second color of the plurality of colors:
  - calculate a second plurality of directionally-interpolated values corresponding to a second plurality of directions, and
  - select a second preferred direction from the second plurality of directions based on the second plurality of gradient strengths, and
  - calculate, as the output pixel value, a respective directionally-interpreted value corresponding to the second preferred direction.

17. The imaging device according to claim 16, wherein the first color is green.

18. The imaging device according to claim 16, wherein the image processing circuit is configured to:
- for a third color of the plurality of colors:
  - calculate, as the output pixel value, a respective directionally-interpreted value corresponding to the second preferred direction.

19. The imaging device according to claim 18, wherein the first color is green, the second color is red, and the third color is blue.

20. A non-transitory computer-readable medium storing thereon instructions that, when executed by a processor of an imaging device, cause the imaging device to perform operations comprising:
- receiving a pixel data from a pixel array, the pixel data including a plurality of linear pixel responses from a corresponding plurality of linear pixel circuits of the pixel array and a plurality of logarithmic pixel responses from a corresponding plurality of logarithmic pixel circuits;
- determining whether a respective one of the plurality of linear pixel responses or the plurality of logarithmic pixel responses is clipped;
- calculating a plurality of directionally-interpolated output pixel values for corresponding ones of the plurality of linear pixel circuits and the plurality of logarithmic pixel circuits;
- in a case where the respective linear pixel response or the respective logarithmic pixel response is clipped, using a corresponding directionally-interpolated output pixel value as a respective output pixel value;
- in a case where the respective linear pixel response or the respective logarithmic pixel response is not clipped, using the respective linear pixel response or the respective logarithmic pixel response as the respective output pixel value; and
- constructing an output image using a plurality of the respective output pixel values.

* * * * *